United States Patent [19]
Wu et al.

[11] Patent Number: 5,249,160
[45] Date of Patent: Sep. 28, 1993

[54] SRAM WITH AN ADDRESS AND DATA MULTIPLEXER

[75] Inventors: Sheau-Dong Wu, Saratoga; Hiro Yoshida, Santa Clara, both of Calif.

[73] Assignee: MOSEL, San Jose, Calif.

[21] Appl. No.: 843,341

[22] Filed: Feb. 28, 1992

Related U.S. Application Data

[63] Continuation-in-part of Ser. No. 755,319, Sep. 5, 1991.

[51] Int. Cl.⁵ .............................................. G11C 8/00
[52] U.S. Cl. ...................... 365/230.08; 365/230.02; 365/189.05
[58] Field of Search .................. 365/230.08, 189.05, 365/230.02, 189.02, 233

[56] References Cited

U.S. PATENT DOCUMENTS

| | | | |
|---|---|---|---|
| 4,408,305 | 10/1983 | Kuo | 365/230.03 |
| 4,451,745 | 5/1984 | Itoh et al. | 365/230.08 |
| 4,566,082 | 1/1986 | Anderson | 365/230.03 |
| 4,811,303 | 3/1989 | Hirai | 365/230.08 |
| 4,907,203 | 3/1990 | Wada et al. | 365/230.03 |
| 5,083,296 | 1/1992 | Hara et al. | 365/230.02 |

*Primary Examiner*—Joseph A. Popek
*Attorney, Agent, or Firm*—Claude A. S. Hamrick

[57] ABSTRACT

A latch ram including on a single chip a memory array, a multiplexed address and data bus for the input of address information and the input/output of data information on the same lines, an address latch and associated row and column decoders for addressing particular locations within the memory array, data I/O and associated column I/O circuitry for inputting data to and outputting data from the memory array, and microprocessor-controlled logic for controlling the input and output of such data. The device is packaged in a 28-pin SOG or TSOP package.

12 Claims, 5 Drawing Sheets

SRAM WITH AN ADDRESS AND DATA MULTIPLEXER

CROSS REFERENCE TO RELATED APPLICATIONS

This application is a continuation-in-part of U.S. Pat. application Ser. No. 07/755,319 (filed Sep. 5, 1991), entitled "LATCH RAM".

BACKGROUND OF THE INVENTION

1. Field of the Invention

The present invention relates generally to memory devices used in computerized control systems and more particularly to an improved static random access memory device (SRAM) having a multiplexed address and data bus for the input of address information as well as the input and output of data information on the same lines, as well as on-chip address latches and associated control logic, all operative to save space and power and reduce component count and manufacturing cost in typical applications.

2. Description of the Prior Art

The decade of the eighties marked the beginning of rapid growth of microprocessors and microcontrollers for real-time embedded control applications. This trend is expected to continue during the 1990's as new integrated circuit components with higher performance and functionality will drive new applications. Advances in microcontroller architecture and process technology have precipitated highly integrated single-chip controllers with larger on-chip storage capacity and more I/O functions. In the midst of this explosive technological change one fact remains constant: the requirements for off-chip memory as program storage and data buffering continues to play a significant role. In most cases, traditional off-chip storage has been mostly used for control programs such as, for example, a set of control instructions for accomplishing a particular task. As such, EPROM (or OTP or ROM) devices are convenient and cost-effective devices to utilize. However, as new applications demand more intelligence and flexibility, read-modify-write operations are becoming an integral part of the entire application. Low-cost static random access memory (SRAM) is an optimum choice to complement and supplement the EPROM or OTP in new control environments. SRAM offers much more flexibility in that it allows stored information to be changed on-line, be it data or program instructions. Furthermore, as new microcontroller applications require increasingly higher speed components, SRAM appears to be the only viable and economical alternative for these cost-sensitive applications.

High-volume embedded control applications, such as intelligent hard-disk, tape and printer applications, continually require reductions in space and cost. By definition, the controller in an embedded control application is physically integrated or embedded inside the mechanism which it is controlling. More often than not, the circuit board space is at a premium. This condition puts great pressure on the system's designers who in turn must look to the semiconductor manufacturers for assistance with solutions that meet the stringent need of absolute minimum chip and pin counts, surface-mount packaging, and extremely low power consumption.

SUMMARY OF THE PRESENT INVENTION

It is therefore an object of the present invention to provide an improved SRAM device having features which accommodate high-speed read and write operations.

Another object of the present invention is to provide an improved SRAM of the type described which allows controller hardware to take on new roles in that many different control programs can be run simply by loading the SRAM on-line with the appropriate control software.

Another object of the present invention is to provide an improved SRAM, the use of which will result in cost savings and convenience.

Another object of the present invention is to provide an improved SRAM which will have high speed access sufficient to support microcontrollers in high speed applications.

Yet another object of the present invention is to provide an improved SRAM which includes a multiplexed address/data bus, providing a direct, one-to-one interface to microprocessors with similar multiplexed address/data buses, and also allowing higher density storage with a lower pin count in order providing space savings in typical applications.

A further object of the present invention is to provide an improved SRAM which allows more stable operation in electrically noisy environments.

A still further object of the present invention is to provide an improved SRAM whose design allows for future expandability without modification of the pin configurations.

Briefly, a preferred embodiment of the present invention includes on a single chip a memory array, a multiplexed address and data bus for the input of address information and the input/output of data information on the same lines, an address latch and associated row and column decoders for addressing particular locations within the memory array, data I/O and associated column I/O circuitry for inputting data to and outputting data from the memory array, and microprocessorcontrolled logic for controlling the input and output of such data.

Among the advantages of the present invention is that it provides a single device which can be used to replace several microcontroller memory components normally used in embedded control applications.

Another advantage of the present invention is that it saves up to two external octal latch chips normally needed to hold the address information obtained from a microcontroller.

Another advantage of the present invention is that it provides a device which will supplement and complement the microcontroller's extended or external memory features.

Yet another advantage of the present invention is that it provides a multiplexed address/data bus, thus providing a direct, one-to-one interface to microprocessors having a similar multiplexed address/data bus, and also allowing greater storage density with a lower pin count in order to save critical space in modern high density electronic applications.

A further advantage of the present invention is that it provides multiple ground and power connections which allow more stable operation in electrically noisy environments.

A still further advantage of the present invention is that it provides extra pins for future expandability, thus providing the potential capability to increase the storage density without modification of the pin configuration These and other objects and advantages of the present invention will no doubt become apparent to those skilled in the art after having read the following detailed description of the preferred embodiment illustrated in the several figures of the drawing.

IN THE DRAWING

DETAILED DESCRIPTION OF THE PREFERRED EMBODIMENT

Figure 1:
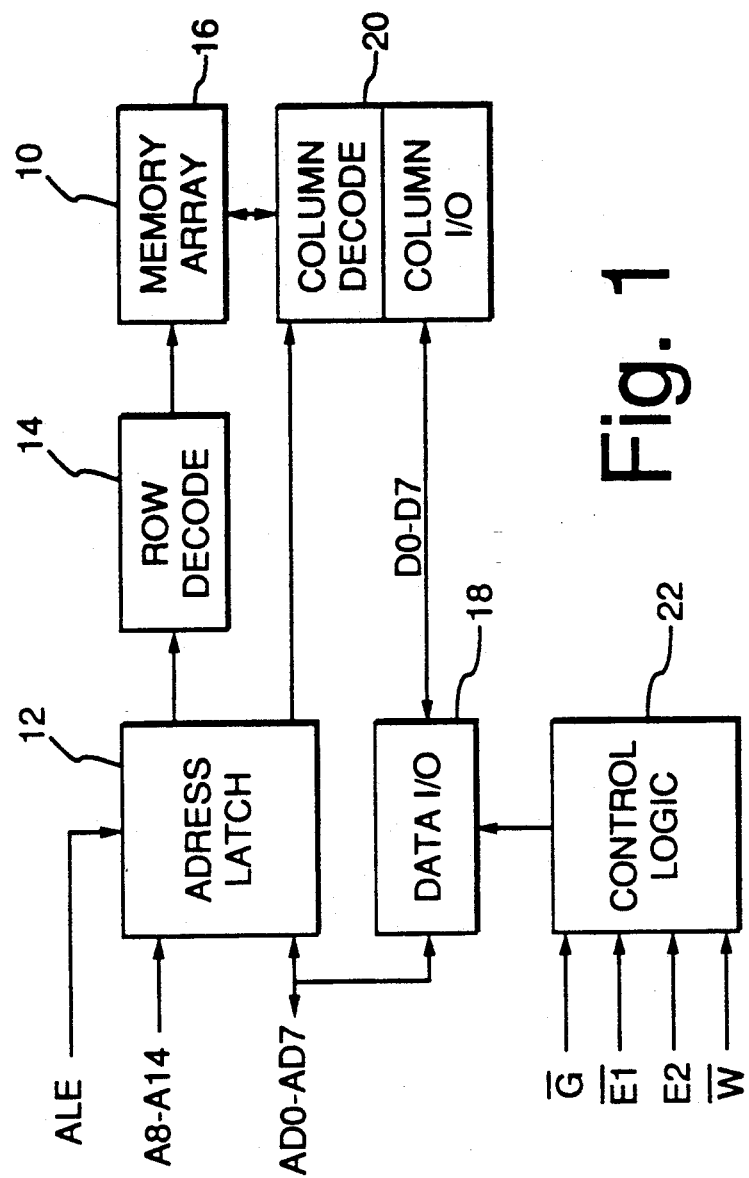
FIG. 1 is a block diagram illustrating the principal functional components of the present invention.

Referring now to FIG. 1 of the drawing, an SRAM in accordance with the present invention is shown in block diagram form to include a memory array 10, an address latch 12 and associated row decoder 14 and column decoder 16. The circuit also includes data I/O 18 and column I/O circuits 18 and 20, respectively, for facilitating the input and output of data to and from memory locations addressed by or through address latch 12, and control logic 22 for controlling the input and output of such data. The external signals associated with the device include address latch enable (ALE), the output enable ($\overline{G}$), the chip enables ($\overline{E}_1$ and $E_2$), the write enable ($\overline{W}$), the address lines ($A_8$–$A_{14}$), and the multiplexed address/data lines ($AD_0$–$AD_7$). The multiplexed address/data lines $AD_0$–$AD_7$ function, at different times during the read and write cycles, as either address and data lines.

The address/data lines $AD_0$–$AD_7$ were multiplexed both to ease interfacing to common microcontrollers and to reduce the pin count on the chip. Most commonly available microcontrollers use a multiplexed address/data bus; that is, the data bus and the lower lines of the address bus share the same lines. Thus, the use of memory chips with a similar multiplexed setup allows simple, one-to-one interfacing between chips. Furthermore, the multiplexed setup reduces the number of pins required to implement the SRAM design, which results in many advantages. First, it allows more address lines to be included, which makes possible higher density SRAM designs in smaller and less expensive chip packages. Second, it allows multiple power and ground pins to be included, which provides increased tolerance to electrical switching noise by dividing the switching current through multiple ground paths. Finally, it allows pins to be set aside for future expandability, thus providing the potential for the addition of advanced features or increases in storage density while providing a smooth upgrade path for designers using the existing chip.

Memory array 10 is, in this embodiment, a 32K by 8 random access memory containing 8-bit word storage locations addressable via fifteen address inputs $AD_0$–$AD_7$ and $A_8$–$A_{14}$ connected to latch 12. The inputs are decoded by the row decoder 14 and column decoder 16. Latch 12 responds to an address latch enable (ALE) input which controls the internal transparent latches on the address pins. When ALE is HIGH, the latch is transparent, and the inputs on the address pins are applied to the memory array 10. On the falling edge of ALE the current input states of address pins are latched and remain applied to the memory array 10 until ALE returns to the HIGH state.

Data I/O 18 includes eight bi-directional data input/output ports that are used to read data from or write data into the memory array 10. Control logic 22 responds to an output enable input $\overline{G}$, chip enables $\overline{E}_1$ and $E_2$, and a write enable input $\overline{V}$ to control operation of the data I/O ports 18.

The output enable input $\overline{G}$ is active LOW. If the $\overline{G}$ input is active and the $\overline{W}$ input is inactive, data will be present on the AD pins and they will be enabled. The AD pins will be forced to the high impedance state when $\overline{G}$ is inactive, which facilitates both the multiplexed setup and the use of a common data bus among multiple components.

The chip enable input $\overline{E}_1$ is active LOW, while $E_2$ is active HIGH. The chip enables must both be active to read from or write to the device. If either $\overline{E}_1$ or $E_2$ is inactive, the device is deselected and is in a stand-by power mode, in which the device consumes a negligible amount of power. The AD pins will be in the high impedance state when the device is deselected, which is important in applications using a common data bus among multiple components.

The write enable input $\overline{W}$ is active LOW and controls read and write operations. When $\overline{W}$ is HIGH and $\overline{G}$ is LOW, output data will be present at the AD pins. When $\overline{W}$ is LOW, the data present on the AD pins will be written into the selected memory location.

Figure 2B:
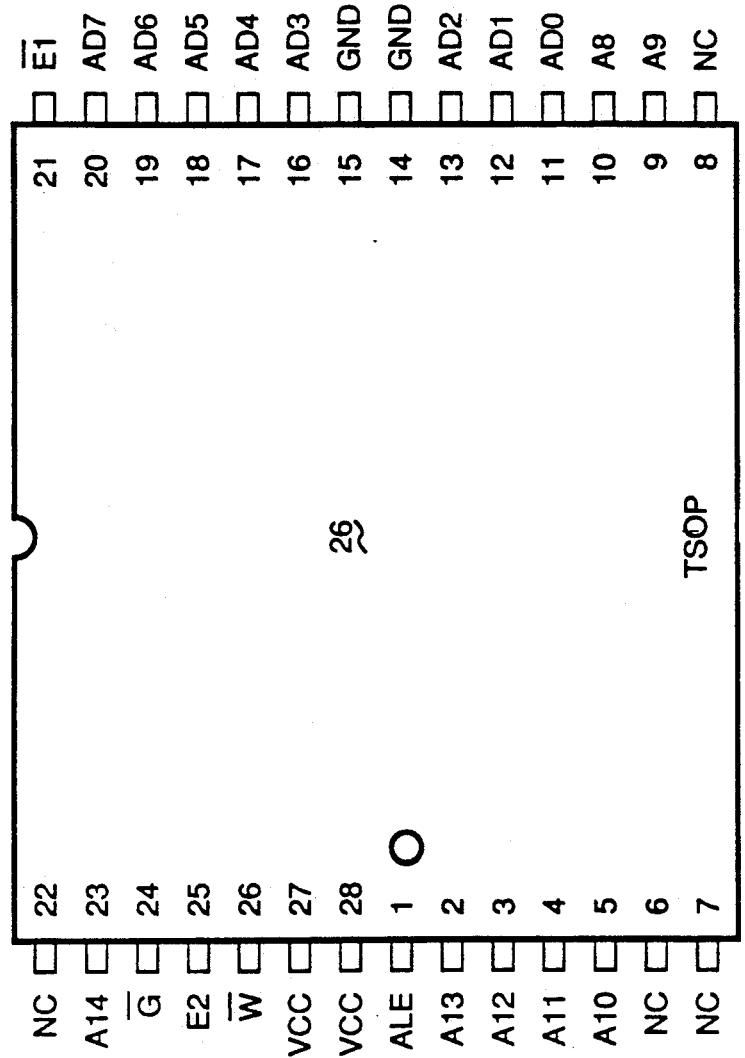
FIG. 2(b) is an illustration of an alternate implementation of the present invention.
Figure 2A:
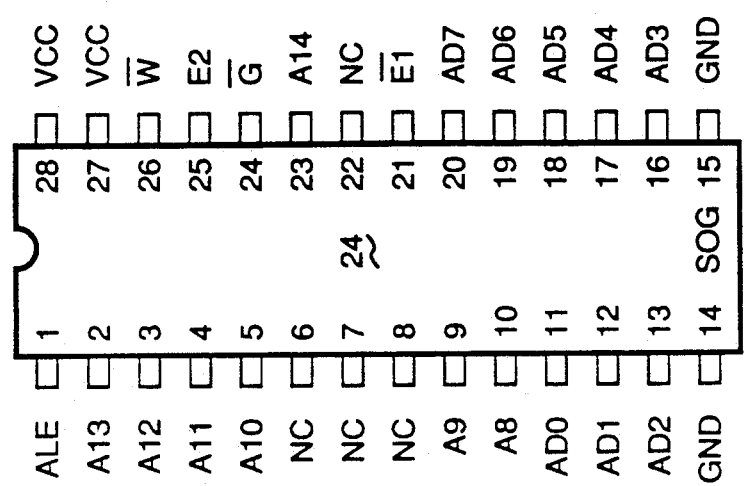
FIG. 2(a) is an illustration of an actual implementation of the present invention.

FIGS. 2(a) and 2(b) show package configurations of two actual implementations of the present invention. The configuration depicted in FIG. 2(a) at 24 is a 32K×8 bit SRAM in a 28-pin SOG package, while FIG. 2(b) at 26 depicts a 32K×8 SRAM in a 28-pin TSOP package. Both packages are slim outline, surface mount package configurations. The use of a multiplexed address/data bus allows the implementation of standard 28-pin packages, rather than the higher pin count packages normally required for a 32K×8 SRAM with similar features.

Figure 3:
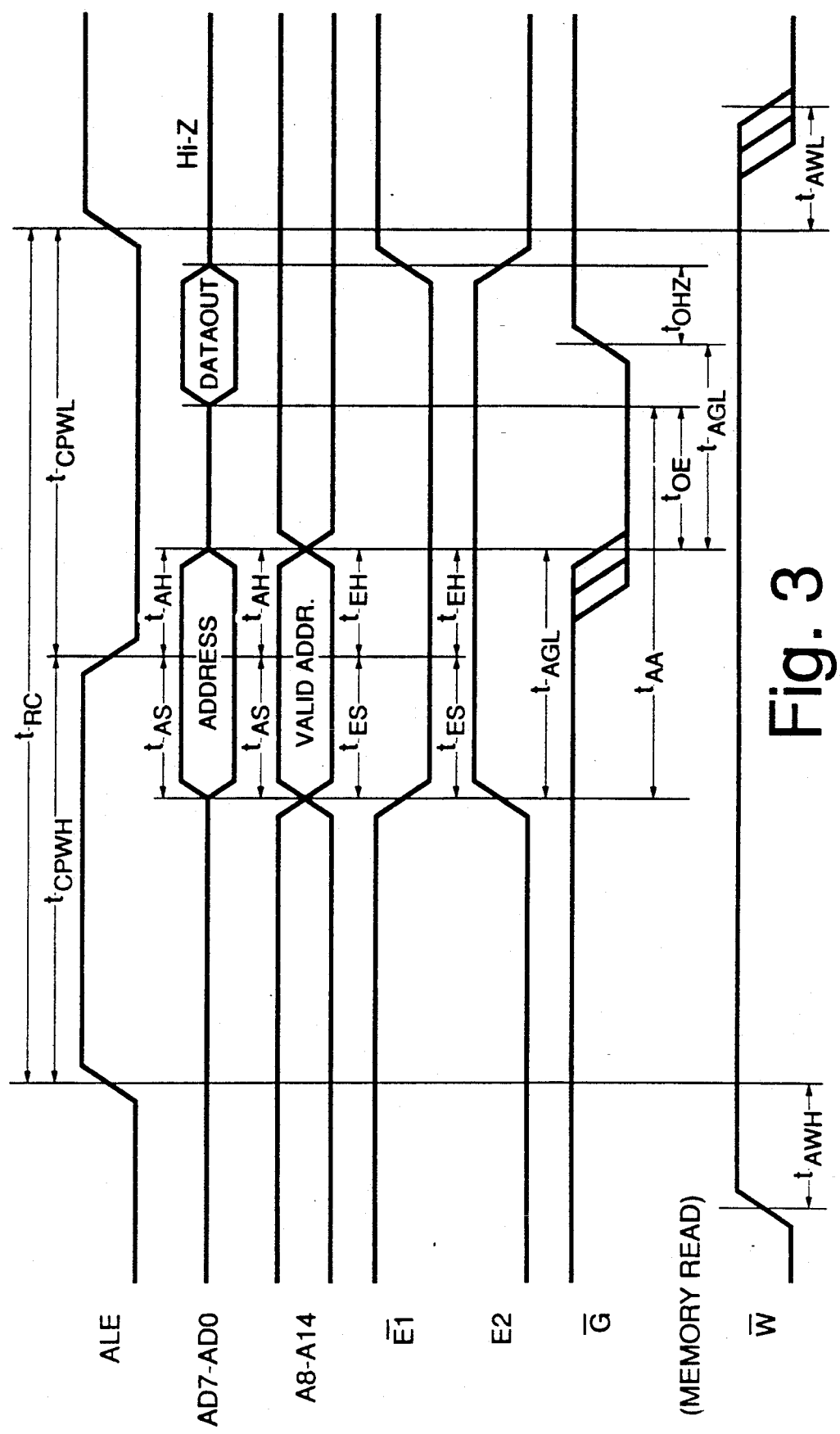
FIGS. 3 and 4 are timing diagrams illustrating operation of the present invention.

Referring now to FIG. 3 of the drawing, a timing diagram for a read cycle is illustrated. The control signals used for both read and write operations are classical SRAM controls, namely the chip enables, output enables and read/write controls. $\overline{W}$ must be held HIGH during the entire read cycle. As illustrated, the ALE is initially set HIGH so that the address latches are transparent. Then, $\overline{E}_1$ and $E_2$ are activated to "turn on" the chip so that I/O operations can be performed. The address of the memory location to be read from is then placed on the address lines $AD_0$–$AD_7$ and $A_8$–$A_{14}$, and the ALE is dropped LOW to latch the address. The output enable $\overline{G}$ is then forced LOW, and after a short delay (represented in the diagram by $t_{OE}$) while the data is retrieved from the memory array, the output data will be available on the address/data lines $AD_0$–$AD_7$. After the data has been read, $\overline{G}$ is then returned HIGH, and the chip enables $\overline{E}_1$ and $E_2$ can be deactivated. During the cycle, it is important that the address be valid for sufficient time (represented by $t_{AGL}$) before the output enable is dropped LOW in order to avoid violating minimum address access specifications. The multiple transitions on the $\overline{G}$ and $\overline{W}$ lines (shown as diagonal stripes) indicate a range of times over which those inputs can be changed.

Figure 4:
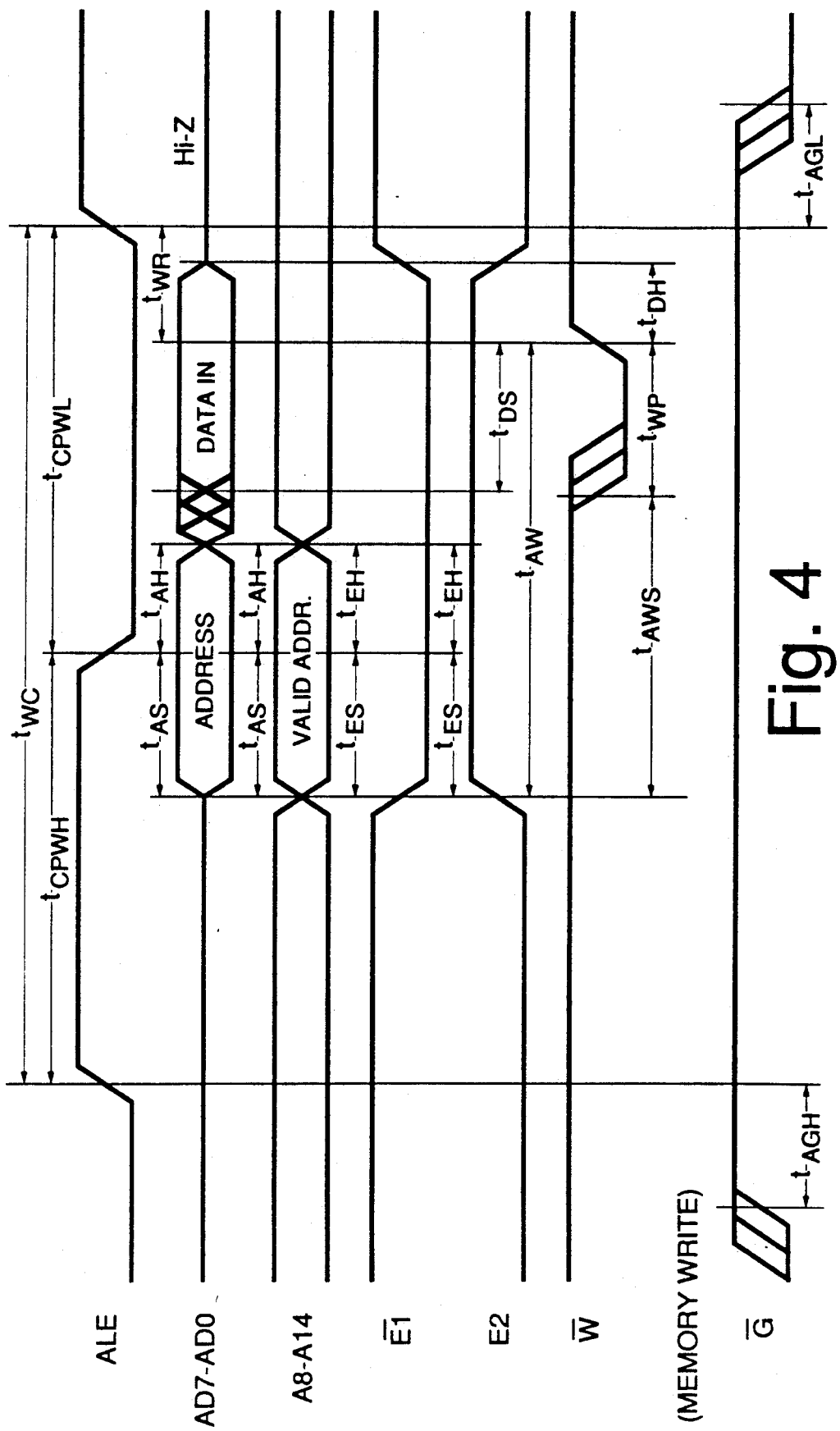

Referring now to FIG. 4 of the drawing, a timing diagram illustrating the switching waveforms for a write cycle is shown. $\overline{G}$ must be held HIGH during the entire write cycle. As illustrated, the ALE is initially set HIGH so that the address latches are transparent. Then, $\overline{E}_1$ and $E_2$ are activated to "turn on" the chip so that I/O operations can be performed. The address of the memory location to be written to is then placed on the address lines $AD_0$–$AD_7$ and $A_8$–$A_{14}$, and the ALE is dropped LOW to latch the address. After the minimum address hold time is met (shown as $t_{AH}$ in the diagram), the data to be written can be placed on the address/data lines $AD_0$–$AD_7$. The write enable $\overline{W}$ is then forced LOW, and the data is written into the memory array. After the data has been written, $\overline{W}$ is then returned HIGH, and the chip enables $\overline{E}_1$ and $E_2$ can be deactivated. During this cycle, it is important that the address be valid for sufficient time (represented by $t_{AWS}$) before the write enable is dropped LOW in order to avoid violating minimum address access specifications. Further, it is critical that the write pulse width be of sufficient width (represented by $t_{WP}$) that the data is reliably written. The multiple transitions on the $\overline{G}$ and $\overline{W}$ lines (shown as diagonal stripes) indicate a range of times over which those inputs can be changed, while the crosses XX shown in the AD lines indicate times during which any changes are permitted.

The present invention in its preferred form is a CMOS static RAM optimized for use with high-speed microcontrollers with multiplexed address/data buses. Examples of such microcontrollers include MOTOROLA MC68HC11, INTEL 8051, INTEL 8096, INTEL 80960, HITACHI HD63183, and NEC $\eta$PD7821X. As indicated above, the device memory is organized to include a predetermined number of binary words and contains on-chip transparent address latches to retain memory address information. In many applications, one such device can replace a combination of multiple SRAMs and octal latches. This configuration offers a significant destiny and cost advantage over a discrete implementation. The preferred embodiment is manufactured using high-performance CMOS technology and operates from a single 5-volt power supply. All inputs and outputs are TTL compatible, and the device is normally packaged in a space-saving surface mount 28 pin 300-mil SOG package or 330-mil TSOP package. The preferred pin-outs and 28-pin package configurations are depicted in FIG. 2(a) (28 pin SOG package at 24) and 2(b) (28 pin TSOP package at 26).

Figure 5:
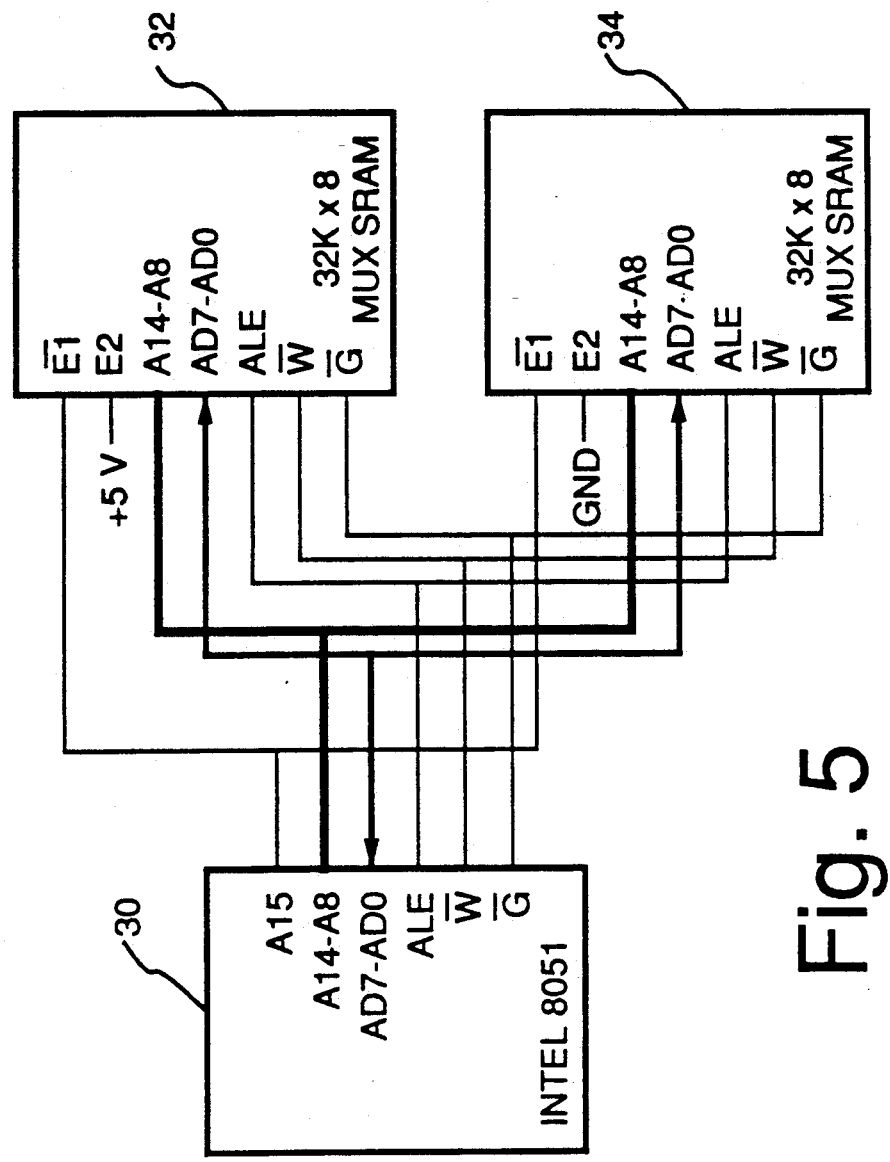
FIG. 5 is a schematic depicting an application of the present invention.

FIG. 5 depicts an application of the present invention as external memory for an Intel 8051 microcontroller 30. The application shown utilizes two Mux SRAMs, 32 and 34, of the present invention in depth-expansion mode. In this mode, multiple SRAMs can be cascaded in a simple fashion to provide large amounts of storage. To use this feature, the high address line A15 of the microcontroller 30 is directly connected to the chip enable $\overline{E}_1$ of a first 32K $\times$B SRAM 32, and A15 is also directly connected to the chip enable $E_2$ of a second 32K$\times$8 Mux SRAM 34. In this way, since one chip enable is active low and the other is active high, address line A15 can be decoded by the SRAMs without additional hardware to select which of the two SRAMs is active. Thus, in the present application, the two 32K $\times$8 Mux SRAMs are depth expanded to provide 64K$\times$8 storage without additional hardware. Additional SRAMs could be added with the addition of a simple external decoder. Further, the Intel 8051, like most popular microcontrollers, has an 8-bit multiplexed address/data bus, represented in the figure as AD7–AD0, which can be directly wired to the corresponding bus of the SRAMs. Finally, the ALE, $\overline{W}$, and $\overline{G}$ of the microcontroller 30 can be directly connected to the corresponding pins of the SRAMs. This application demonstrates the simplicity with which the Mux SRAM of the present invention can be interfaced to a microcontroller.

The present invention has particular applicability to 8-bit, 16-bit, and 32-bit embedded control applications which meet a diversity of needs. The inclusion of two complementary chip enables allows memory depth expansion without external hardware. Microcontrollers with ROM-less option and those with external memory expansion capability can now take full advantage of these low-cost latched, multiplexed SRAMs.

Typical applications of the present invention will be made in the microcontrollers of consumer products such as facsimile devices, copiers, modems, etc.; computer peripherals such as printers, disk drives, tape drives; avionics; industrial automation; instrumentation; telecommunications; and automotive operations. The present invention is fully compatible to industry's most popular microcontrollers, whether they are 8-bit, 16-bit or the latest 32-bit and 64-bit (RISC) varieties.

The on-chip address latch of the device is a particularly useful feature in that it saves up to three external octal latch chips which are normally needed to hold the address from the microcontroller. When high-density memory is used, the device can further help shrink chip count by its large storage capacity. As a result of its simple interface, the subject invention will supplement and complement the microcontroller's extended (or external) memory features. Since most applications require external storage to boost performance and flexibility, a large number of the state-of-the-art microcontrollers can take full advantage of the present invention.

Although the present invention has been described above in terms of preferred embodiments, it will be appreciated that various alterations and modifications thereof may become apparent to those of ordinary skill in the art. It is therefore intended that the appended claims cover all such alterations and modifications as fall within the true spirit and scope of the invention.

What is claimed is:

1. A single chip latched SRAM device comprising:
   a memory array organized to store data in a word format with each word containing a predetermined number of data bits;
   address latch means having an address latch enable (ALE) input line, said latch means being responsive to an ALE input signal applied to said input line and operative to selectively couple a plurality of input address lines to said memory array for addressing particular locations in said memory array, said address latch means being functionally transparent when the input to said ALE input signal is of one state, and the output therefrom being latched when the ALE input signal is of a second state;
   data input/output means for selectively coupling a plurality of data input/output lines to said memory array and responsive to a control signal to determine when data is to be input thereto or output therefrom, one or more of said data input/output lines sharing common external connections with corresponding input address lines; and control logic means responsive to an output enable signal ($\overline{G}$), chip enable signals ($\overline{E}_1$ and $E_2$) and a write enable signal ($\overline{W}$), and operative to develop said control signal for controlling said data input/output means such that when $\overline{G}$ is of one state and $\overline{W}$ is of one state, data from said memory array will be output to said input/output lines, and when $\overline{W}$ is of a second state and $\overline{G}$ is of a second state, data present on said input/output lines will be written into an addressed memory location, and wherein when $\overline{E}_1$ is of a first state and $E_2$ is of a first state, the device is selected, and when $\overline{E}_1$ is of a second state and $E_2$ is of a second state, the device is deselected;

wherein said address latch enable (ALE) input signal and said control signal are operative to determine whether the lines sharing common external connections function as input address lines or data input/output lines.

2. A single chip latched SRAM device as recited in claim 1 and further comprising:

row decoder means and column decoder means associated with respective ones of said input address lines and operative to individually address selected word storage sites within said memory array.

3. A single chip latched SRAM device as recited in claim 2 and further comprising:

column input/output means associated with said column decoder means and said data input/output means and operative to couple an addressed memory site to said input/output lines.

4. A single chip latched SRAM device as recited in claim 1, 2 or 3 wherein said device is packaged in a 28-pin TSOP package.

5. A single chip latched SRAM device as recited in claim 1, 2 or 3 wherein said device is packaged in a 28-pin SOG package.

6. In a microcontroller system including a microprocessor and memory means for storing processing data, an improved memory means embodied in one or more integrated circuit device each comprising:

a memory array organized to store data in a word format with each word containing a predetermined number of data bits;

address latch means having an address latch enable (ALE) input line, said latch means being responsive to an ALE input signal applied to said input line and operative to selectively couple a plurality of input address lines to said memory array for addressing particular locations in said memory array, said address latch means being functionally transparent when the input to said ALE input is of one state, and the output therefrom being latched when the ALE input is of a second state;

data input/output means for selectively coupling a plurality of data input/output lines to said memory array and responsive to a control signal to determine when data is to be input thereto or output therefrom, one or more of said data input/output lines sharing common external connections with corresponding input address lines; and control logic means responsive to an output enable signal ($\overline{G}$), chip enable signals ($\overline{E}_1$ and $E_2$) and a write enable signal ($\overline{W}$), and operative to develop said control signal for controlling said data input/output means such that when $\overline{G}$ is of one state and $\overline{W}$ is of one state, data from said memory array will be output to said input/output lines and when $\overline{W}$ is of a second state and $\overline{G}$ is of a second state, data present on said input/output lines will be written into an addressed memory location, and wherein when $\overline{E}_1$ is of a first state and $E_2$ is of a first state, the device is selected, and when $\overline{E}_1$ is of a second state and $E_2$ is of a second state, the device is deselected;

wherein said address latch enable (ALE) input signal and said control signal are operative to determine whether the lines hearing common external connections function as input address lines or data input/output lines.

7. In a microcontroller system as recited in claim 6 and further comprising:

row decoder means and column decoder means associated with respective ones of said input address lines and operative to individually address selected word storage sites within each said memory array.

8. In a microcontroller system as recited in claim 7 and further comprising:

column input/output means associated with said column decoder means and said data input/output means and operative to couple an addressed memory site to said input/output lines.

9. In a microcontroller system as recited in claim 8, wherein said memory means includes first and second integrated circuit devices, and said microprocessor generates a high order address signal which is connected as chip enable signal $\overline{E}_1$ of said first integrated circuit device, and said high order address signal is also connected as chip enable signal $E_2$ of said second integrated circuit device, whereby said high order address signal functions to select which of said integrated circuit devices is active.

10. In a microcontroller system as recited in claim 6, 7, 8 or 9, wherein said integrated circuit devices are packaged in 28-pin TSOP packages.

11. In a microcontroller system as recited in claim 6, 7, 8 or 9, wherein said integrated circuit devices are packaged in 28-pin SOG packages.

12. A single chip latched SRAM device as recited in claims 1, 2 or 3 and further comprising:

two or more external connections for power input; and two or more external connections for ground input.

* * * * *